May 14, 1957   D. H. HATHORN   2,792,262
PNEUMATICALLY DISCHARGED VESSEL FOR PULVERULENT MATERIALS
Filed April 8, 1955
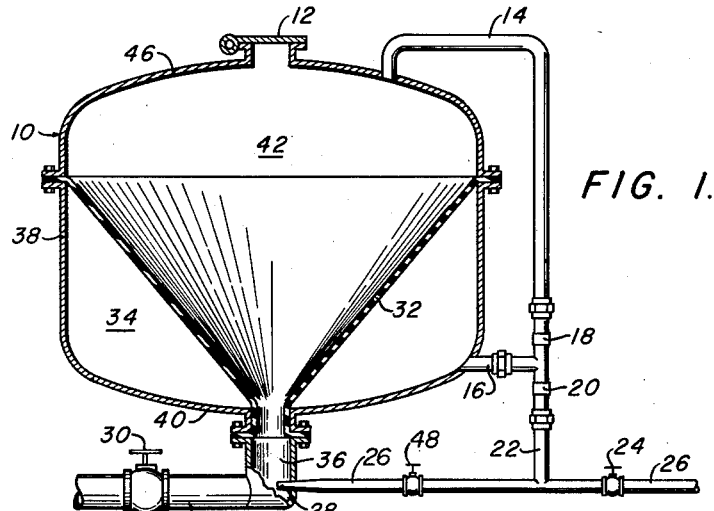
FIG. 1.
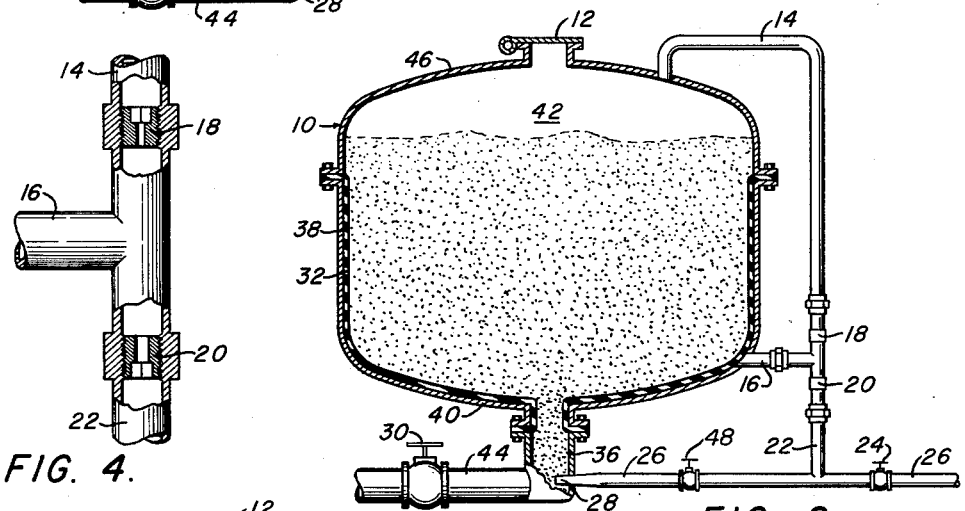
FIG. 4.
FIG. 2.
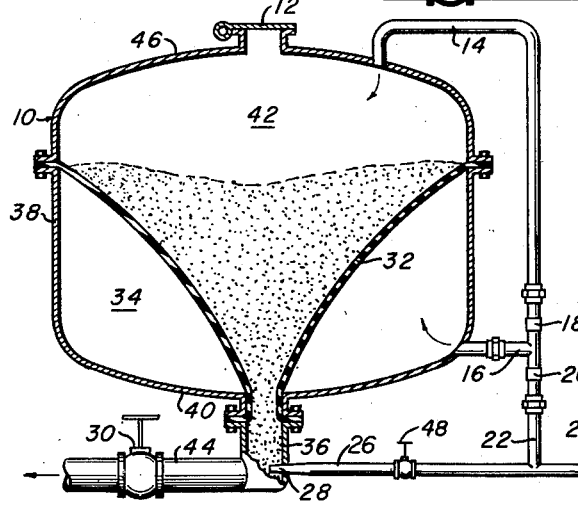
FIG. 3.
INVENTOR.
Don H. Hathorn,
BY Earl Babcock,
ATTORNEY.

United States Patent Office 2,792,262
Patented May 14, 1957

2,792,262

PNEUMATICALLY DISCHARGED VESSEL FOR PULVERULENT MATERIALS

Don H. Hathorn, Duncan, Okla., assignor to Halliburton Oil Well Cementing Company, Duncan, Okla.

Application April 8, 1955, Serial No. 500,174

3 Claims. (Cl. 302—53)

This invention relates generally to apparatus employed in the pneumatic method of handling and conveying pulverulent materials and more specifically to an improved storage and discharge vessel for use in connection with this apparatus.

In general the art of pneumatic loading and conveying is old, having many patents issued on various methods and structures. The earliest of which I am aware is Patent No. 285,047 issued to J. Lewis in 1883. Commercial application of these methods have met with fair success in the handling of grains, flours, and of late dry bulk cement. To my knowledge the storage vessels heretofore used in connection with pneumatic apparatus have had generally fixed shapes and proportions due to inherent properties of the stored material. Since dry granular or pulverized materials have individual repose angles, vessels used in their storage usually, have hopper or funnel shaped bottoms corresponding to these angles in order to effect complete discharge of the material. Such vessels have high centers of gravity and are of less capacity than flat bottomed containers of the same diameter and height. While these factors may not be of primary importance for fixed installations, they do become of greater importance when such equipment is installed on and used with mobile equipment. Advantages in construction and operation of mobile units are gained when such vessels are as compact as possible and have a center of gravity as low as possible.

The important objective of this invention is to provide an improved vessel, within comparable overall dimensions of those presently used in the storage of granular or pulverulent material, having greater storage capacity, a lower center of gravity, and means to be completely emptied.

This invention is in the nature of a resilient hopper attached to the inside walls and around a bottom discharge opening of a vessel in such a manner as to form an annular cavity (hereinafter called space) bounded by the hopper, the vessel bottom, and the vessel sides. In filling the vessel the weight of the stored material flexes the hopper to conform to the sides and bottom of the vessel and displaces the annular space with stored material. When discharging the stored material, the resilience of the hopper, aided by the introduction of pressure into said annular space, serves to return the hopper to its original shape and thereby effect complete removal of the stored material.

Other advantages will become apparent from the following description drafted in reference to the accompanying drawings in which:

Fig. 1 is a vertical sectional elevation of the apparatus provided by this invention, illustrating the vessel prior to filling.

Fig. 2 is a vertical sectional elevation of the apparatus, illustrating the vessel filled with material and prior to the discharge procedure.

Fig. 3 is a vertical sectional elevation of the apparatus, illustrating the vessel as nearing completion of a discharge operation.

Fig. 4 is a sectional detail, illustrating the orifices provided for regulation of pressures as later described.

Referring to Fig. 1 the invention is comprised of a pressurable vessel 10, having a top 46, sides 38, and a bottom 40. The top 46 of the vessel 10 has a filling opening adapted to be closed by the lid 12. The bottom 40 of the vessel 10 has a discharge conduit 36 to which is attached a discharge conduit 44, having a closure valve 30. Said discharge opening 36 has an air supply 26, controlled by valve 48, and terminating in a jet 28. Flanged to the sides 38 and to the bottom 40, around the discharge conduit 36, is a resilient hopper 32, its arrangement in the vessel 10 being such that two chambers or spaces are formed, an upper space 42, and a lower space 34. The top 46 has a pressure conduit 14 for the purpose of applying pressure in the upper space 42. The side 38 below the attachment of the hopper 32 has a pressure conduit 16 for the purpose of applying pressure in the lower space 34. These conduits 14 and 16 to the upper space 42 and the lower space 34 are joined to a common conduit 22. This common conduit 22 terminates in the supply conduit 26 and has a restriction 20 therein for the reduction of pressure to the upper and lower spaces 42 and 34. Pressure is controlled in both lines 22 and 26 by a common control valve 24. The upper space conduit 14 has a restriction 18 therein for creating a pressure differential and causing lower space 34 to have a greater pressure than the upper space 42.

It is to be understood that the restrictions 18 and 20 are shown as a simple means of attaining the heretofore mentioned results only at such time as air is flowing through the conduits 14 and 22. If, as when the vessel 10 is intermittently emptied, the equalization of pressures is not desired, a commercial type pressure differential regulator of adequate capacity may be substituted for the upper space conduit restriction 18 and a commercial type pressure reduction regulator of adequate capacity for the common conduit restriction 20.

It is also understood that the flanged means of attaching the resilient hopper 32 to the sides 38 and around the discharge conduit 36 of the vessel 10 is illustrative only, and that other means may be employed.

In the normal operational sequence of this invention, the discharge line valve 30 and the air supply valve 24 are closed and the filling opening 12 is open prior to filling. Material is admitted into the upper space 42, of the vessel 10, through the filling opening 12 by means not shown. As the upper space 42 fills, the hopper 32, in response to the weight of the incoming material, flexes and conforms to the sides 38 and the bottom 40. The hopper 32, when the vessel 10 has been filled, conforms to the sides 38 and the bottom 40 as illustrated in Fig. 2. To empty the vessel, the filling opening 12 is latched closed, and the air supply valves 24 and 48 are opened, admitting air through the exit jet 28. Since the discharge line valve 30 is still closed, the air from the jet 28 travels up through the discharge conduit 36, aerating the stored material and pressuring the upper space 42. Air will also be entering into both the upper space 42 through conduit 14 and the lower space 34 through conduit 16 but at a lower rate caused by the air reducing restriction 18. When the pressure in upper space 42 has reached a desired predetermined level, the discharge valve 30 is opened. The stored material, in response to gravity and to the air pressure above it in the upper space 42, enters into the discharge conduit 36 in a flow of laminar nature. The air from the discharge jet 28 entrains this material and injects it into the discharge line 44. The material that is in lower space 34 is at this time relatively static, creating, because of its repose angle, a natural hopper for the remainder of the discharging material. As the material empties from the upper space 42 and the weight of the remaining material lessens, the resilience of the hopper, aided by the pressure of the air introduced into the lower space 34, gradually returns the hopper to its original shape. As best shown in Fig. 3, the material in the lower space 34 is thus forced out of the space 34 and into the stream of discharging material. Continued flow with the hopper 32 in its normal position completely empties the vessel 10.

It has been found that some pulverulent materials tend to hold air and expand somewhat when aerated. Such materials behave more nearly like a liquid and in such cases the jet 28 functions primarily to first aerate the material and then, as the discharge line valve 30 is opened, to initiate its passage into the discharge line. Valve 48 may then be closed, stopping the jet 28, as air at this point is no longer needed for continued flow of the material.

Upon emptying, the air supply valve 24 is closed and the pressures in spaces 42 and 34 equalize, causing the hopper to revert to the position shown in Fig. 1.

As the vessel empties, the amount of air supplied is purposely insufficient to maintain a constant pressure in spaces 42 and 34. This is accomplished by restriction 20, which causes the pressures in spaces 42 and 34 to reduce as their air volume increases. This gradual decrease in pressure is desired to minimize any sudden surge as the emptying of the vessel 10 breaks the seal created by the material in the discharge conduit 36.

It will be apparent to those skilled in the art that certain suitable changes may be made in the device herein disclosed, all without departing from the spirit of the invention; and, therefore, I do not limit myself to that shown in the drawings and specification, but only as indicated in the appended claims.

I claim:

1. In apparatus for handling pulverulent material, a storage vessel having a discharge conduit and a filling opening with a lid, so that pressure may be maintained in the vessel when pulverulent material overlies the discharge conduit, a hopper of flexible material located within said vessel and, when no pulverulent material is in the vessel, dividing the same into two closed chambers, one above and one below the hopper, the lower end of said hopper being connected to said discharge conduit, said hopper being sufficiently flexible to conform to the shape of said vessel when pulverulent material is placed within it, means for supplying air under pressure to said two chambers, and means for causing the air supplied to the chamber below the hopper to be greater than that supplied to the chamber above the hopper.

2. The apparatus defined in claim 1 in combination with means for causing the pressures in said chambers to decrease gradually as pulverulent material is discharged therefrom.

3. The apparatus defined in claim 1 in combination with a pipe adapted to be connected to a source of air under pressure, means for supplying air from said pipe to said chambers, an air jet in said discharge conduit from said vessel, means for supplying air from said pipe to said jet, and a restriction in said supply means to said chambers whereby the pressure at the jet is maintained higher than that in either of said chambers.

References Cited in the file of this patent

UNITED STATES PATENTS

| 2,646,905 | Vincent | July 28, 1953 |

FOREIGN PATENTS

| 251,777 | Italy | Feb. 2, 1927 |